(12) United States Patent
Elwell

(10) Patent No.: US 8,020,270 B2
(45) Date of Patent: Sep. 20, 2011

(54) APPARATUS FOR REPLACING A DOME LIGHT IN A FIXTURE

(75) Inventor: James P. Elwell, Johnston, IA (US)

(73) Assignee: Putco, Inc., Story City, IA (US)

( * ) Notice: Subject to any disclaimer, the term of this patent is extended or adjusted under 35 U.S.C. 154(b) by 684 days.

(21) Appl. No.: 12/026,305

(22) Filed: Feb. 5, 2008

(65) Prior Publication Data

US 2009/0193640 A1    Aug. 6, 2009

(51) Int. Cl.
*B23P 6/00*    (2006.01)
*B23P 19/04*    (2006.01)

(52) U.S. Cl. ............... 29/402.08; 29/402.09; 29/402.13; 29/402.14; 362/13; 362/217.1; 362/249.02

(58) Field of Classification Search ............ 29/854, 29/402.08–402.14, 874; 362/13, 147, 217.1, 362/218, 229, 249.02, 404
See application file for complete search history.

(56) References Cited

U.S. PATENT DOCUMENTS 7,686,470 B2 *    3/2010    Chiang .................. 362/147

OTHER PUBLICATIONS

Packaging label in Japanese, Luxer1 LED, BRM21 USA, Inc. www. brm21.com, 1 page, at least as early as Feb. 4, 2007.
TERA Room Lamp, PIAA Corporation, Japanese, at least as early as Feb. 4, 2007, 1 page.
Kao, Henry, LED Room Lamp, www.digimaxproducts.com, at least as early as Feb. 4, 2007, 1 page.

* cited by examiner

*Primary Examiner* — Thiem Phan
(74) *Attorney, Agent, or Firm* — McKee, Voorhees & Sease, P.L.C.

(57) ABSTRACT

The apparatus requires a replacement board capable of replacing the existing bulb.

3 Claims, 4 Drawing Sheets

US 8,020,270 B2

APPARATUS FOR REPLACING A DOME LIGHT IN A FIXTURE

BACKGROUND OF THE INVENTION

The present invention relates to a method and apparatus for replacing a vehicle dome light. Specifically, the invention relates to a replacement circuit board that can replace an existing bulb that is clamped between two clamps.

By replacing a single bulb with a circuit board including a plurality of LEDs thereon it is possible to increase the brightness of the dome light. While a plurality of different bulbs may be utilized, it is preferable to use LEDs.

Therefore, a primary object of the present invention is the provision of a circuit board containing a plurality of bulbs or light fixtures electrically connected to one another, which can replace a single bulb.

A further object of the present invention is the provision of a circuit board having clamps on one surface thereof and having a plurality of bulbs or lights on the other surface thereof.

A further object of the present invention is the provision of a circuit board having a pair of contacts which are attachable to and fit within the existing clamps in the fixture.

A further object of the present invention is the provision of a replacement circuit board which utilizes a plurality of LEDs and which includes two contacts which engage the clamps within the fixture and are electrically connected to the LEDs.

A further object of the present invention is the provision of a replacement circuit board which can be quickly and easily replaced within an existing dome light.

A further object of the present invention is the provision of a replacement circuit board which is attractive in appearance, efficient in operation, and which utilizes a minimum of structure for the replacement of the bulbs.

BRIEF SUMMARY OF THE INVENTION

The foregoing objects may be achieved by a method for replacing a vehicle dome light comprising removing an existing bulb having first and second ends from the first and second clamps which engage the first and second ends respectively and which are free from electrical connection with one another except through the existing bulb. Next a replacement board is attached having a first contact and a second contact corresponding to the first and second clamps respectively. The replacement board has a plurality of replacement bulbs thereon electrically connected between the first and second contacts. Next, electricity is delivered to the first clamp whereby the replacement bulbs are lighted from the electricity passing through the first clamp, to the first contact, to the plurality of replacement bulbs, to the second contact, and to the second clamp.

According to another feature of the present invention, the use of LEDs as replacement bulbs contributes a brighter light when lighted than the existing bulb when lighted.

According to another feature of the present invention, the replacement board has a plurality of edges. The replacement board has one surface area comprising more area than the edges of the replacement board and another surface area comprising more area than the edges of the replacement board. The method further comprises placing the replacement bulbs on the one surface and placing the first and second contacts on the other surface.

The foregoing objects may be achieved by an apparatus for replacing a dome light comprising an existing bulb having first and second metallic ends and a glass bulb containing a filament extending between the first and second metallic ends. The first and second metallic ends are electrically connected to one another through the filament. A fixture is provided that has first and second clamps fixed to the fixture. The existing bulb has first and second metallic ends removably clamped and electrically connected to the first and second clamps. A replacement board is capable of replacing the existing bulb. The replacement board has a plurality of replacement bulbs electrically connected to one another and a third clamp that is capable of clamping to the first clamp and a fourth clamp that is capable of clamping to the second clamp.

DETAILED DESCRIPTION OF THE PREFERRED EMBODIMENT

Figure 6:
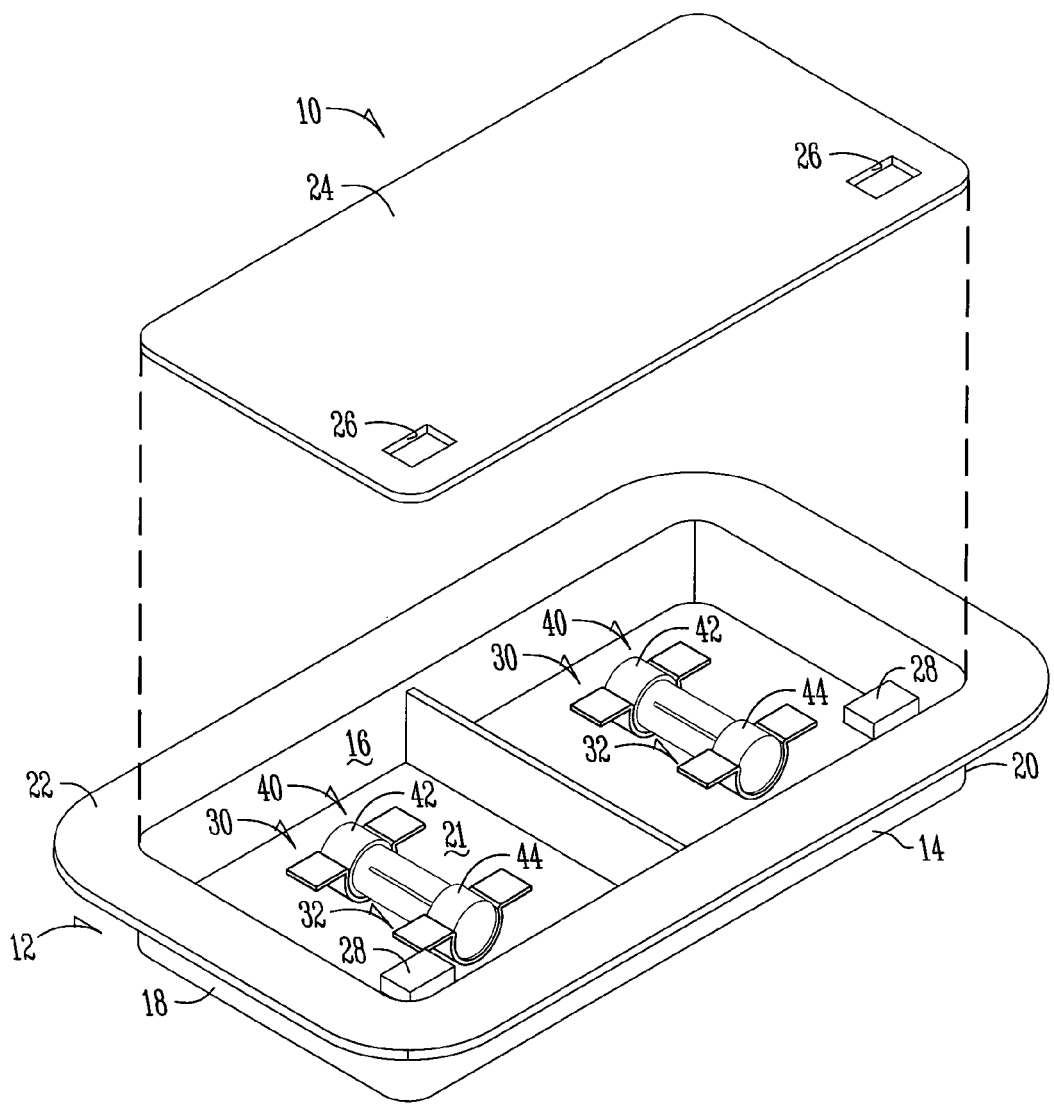
FIG. 6 is a perspective view of a prior art, showing the bulbs that are mounted within the clamps.
Figure 7:
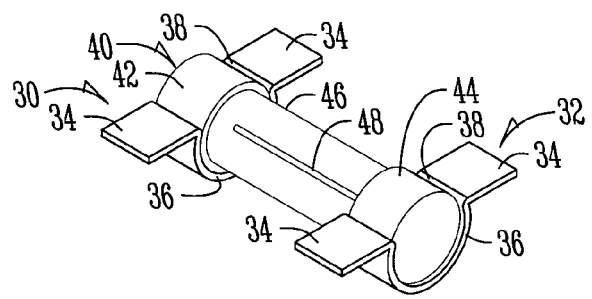
FIG. 7 is an enlarged perspective view of one of the bulbs and the clamps.

Referring to FIGS. 6 and 7, a prior art dome light 10 is shown. Dome light includes a base 12 comprising a box front 14, a box rear 16, a box left side 18, and a box right side 20 and a box floor 21. A box flange 22 extends around the upper edges of walls 14-20.

A lens 24 includes apertures 26 for accommodating switches 28.

Mounted to the floor 21 is a first clamp or contact 30 and a second clamp or contact 32. These clamps include wings 34, (FIG. 7) an arcuate portion 36, and a space 38. The electrical circuitry is not shown in the drawings.

An existing bulb 40 includes a first end 42, a second end 44, and a glass bulb 46 having a filament 48 therein which extends between the first end 42 and the second end 44.

As seen in FIG. 7, the clamps 30, 32 retain the ends 42, 44 respectively of the existing bulb 40. This is because the spaces 38 are slightly less than 180°, and the clamps 30, 32 spring outwardly and back to accommodate the existing bulb 40. The bulb 46 includes the filament 48 which extends between the opposite ends 42, 44 and provides electrical connection therebetween.

Figure 3:
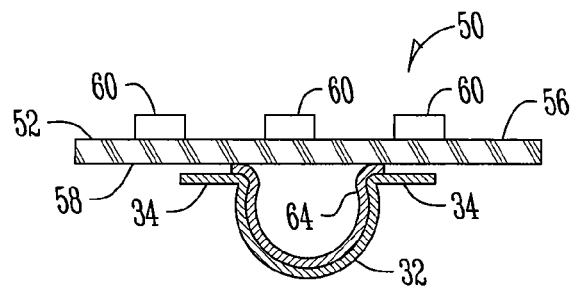
FIG. 3 is a sectional view taken along line 3-3 of FIG. 2.
Figure 4:
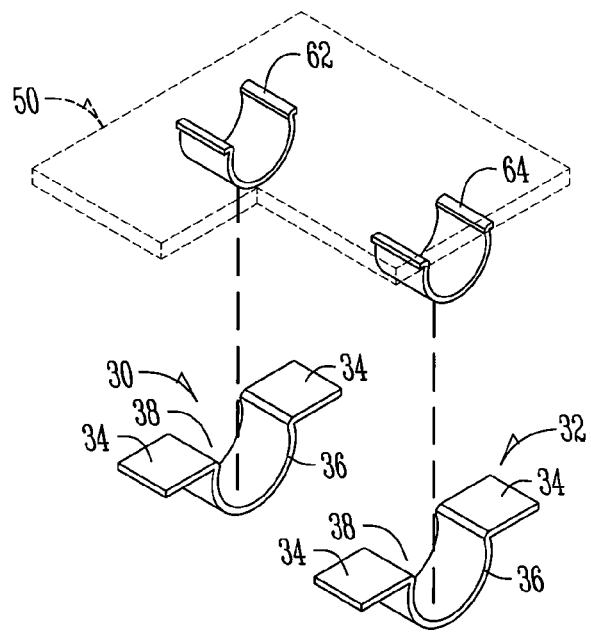
FIG. 4 is a perspective exploded view of the circuit board of the present invention and the clamps there below.

The invention is shown in FIGS. 1-5. A replacement board 50 is provided for replacing the bulb 40. Replacement board 50 includes a board 52 which includes a parametric edge 54, a first surface 56, and a second surface 58 (FIG. 3). The surfaces 56, 58 are considerably greater in area than the edges 54. Mounted on one of the surfaces 56 are a plurality of LEDs. The LEDs may be replaced by bulbs 60 which may vary from LEDs. The LEDs (or other bulbs 60) are connected to one another and are also connected to first and second contacts or clamps 62, 64 which are mounted on the second surface 58. The clamps or contacts 62, 64 provide electrical connection to the various LEDs or bulbs 60. Thus, the existing bulbs 40 (FIGS. 6 and 7) are replaced by the contacts 62, 64 which are inserted into the space 38 within clamps 30, 32. It should be noted that the contacts 62, 64 are a replacement for the ends 42, 44 of existing bulb 40. Furthermore, the contacts 62, 64 electrically connect all of the LEDs or bulbs 60 so that a plurality of bulbs or LEDs 60 replace the single bulb 46 and the filament 48.

Figure 5:
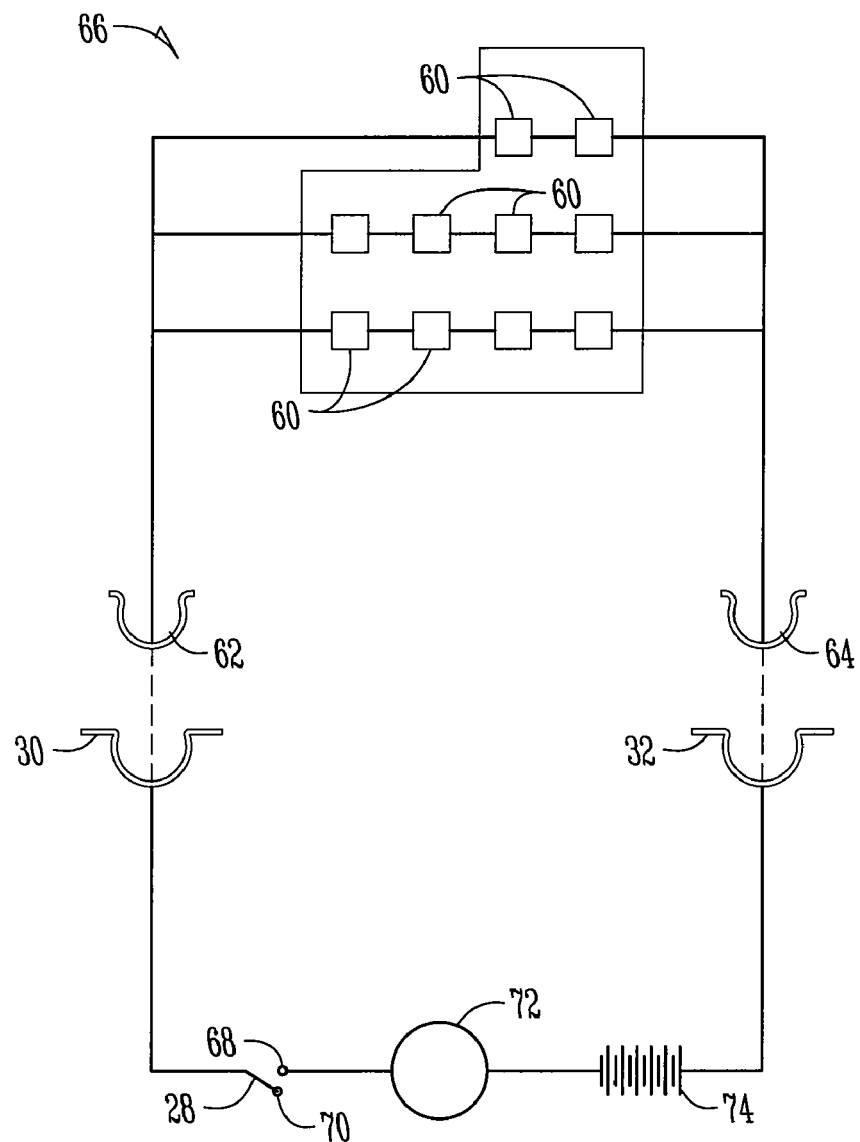
FIG. 5 is a schematic view of the present invention.

Referring to FIG. 5, a circuitry 66 includes a switch 28 which is moveable between an inoperative contact 70 and an operative contact 68. Similarly, a generator or alternator 72 and a battery 74 are provided in the circuitry and LEDs or bulbs 60 are mounted within the clamps 30, 32 and the contacts 62, 64. Additional resistors or other components may be added to the circuitry to produce the desired result.

Figure 1:
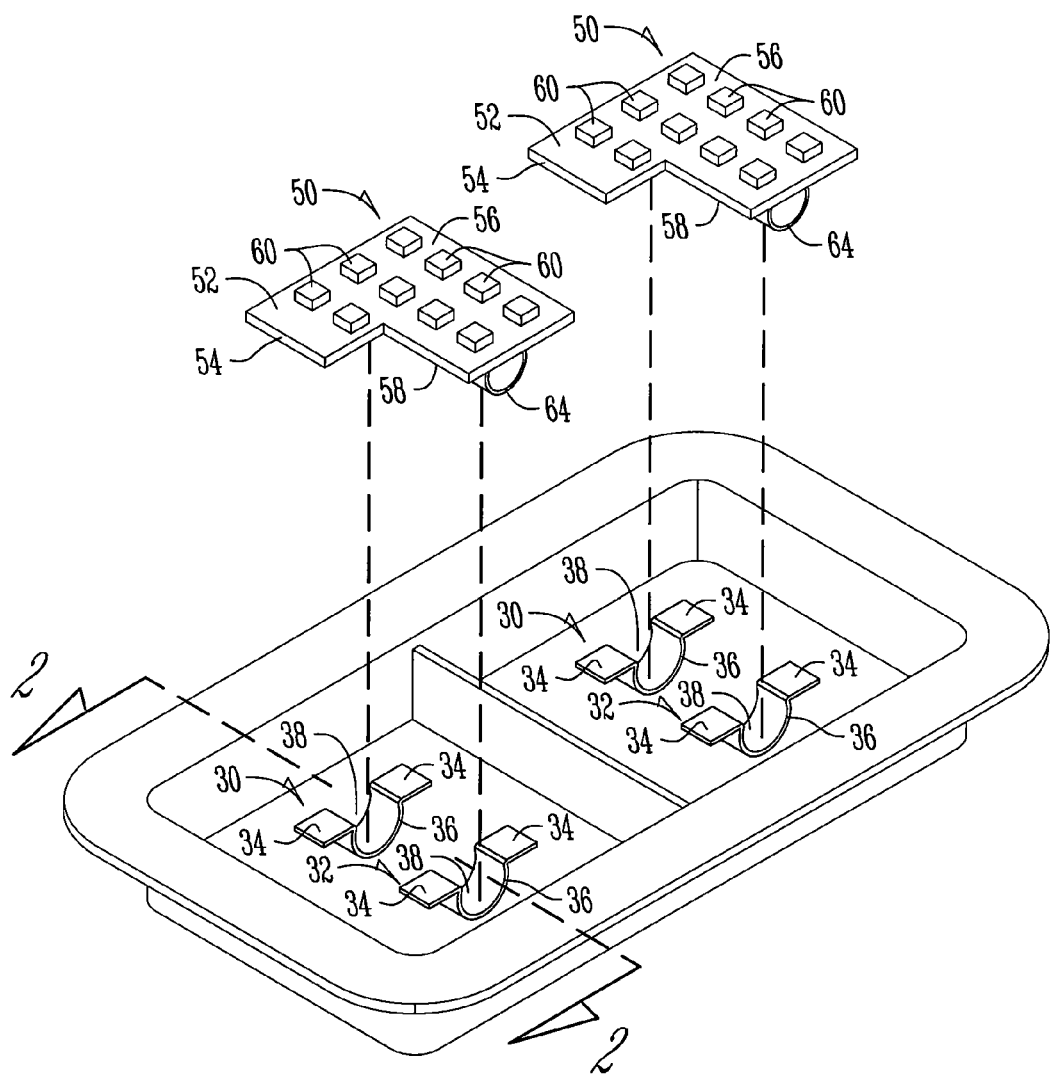
FIG. 1 is an exploded perspective view of the replacement boards that are utilized to replace the bulbs mounted within the clamps.
Figure 2:
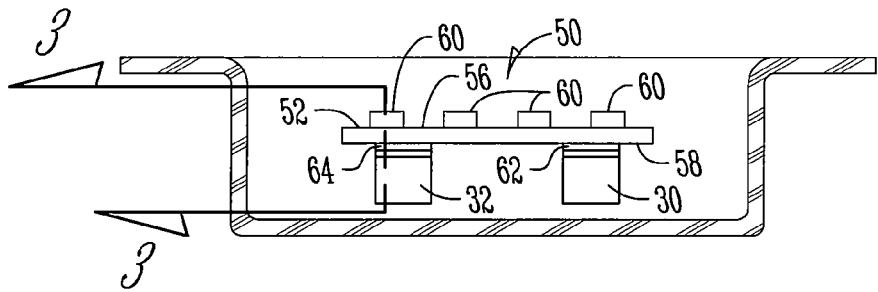
FIG. 2 is a sectional view taken along line 2-2 of FIG. 1.

The method of operation is as follows: The existing bulbs 40 are removed from the clamps 30, 32 by springing the wings 34 thereof away from one another and releasing the ends 42, 44 of the bulb 40 through the spaces 38. This leaves the device similar to what is shown in FIG. 1. Replacement boards 50 are positioned in the manner shown in FIG. 1 and are depressed inwardly to the clamps 30, 32. The first and second contacts 62, 64 (FIGS. 1-3) cause the spaces 38 to expand as a result of the wings 34 expanding radially outwardly in response to the insertion of the contacts 62, 64. The contacts 62, 64 are of complimentary structure and content to the ends 42, 44 of the existing bulb 40, and as a result, the insertion of the contacts 62, 64 results in the attachment of the clamps 30, 32. (FIG. 3).

When the switch 28 is moved from the inoperative contact 70 to the operative contact 68, electricity is delivered through the clamp 32 to the electrical contact 64, to the LEDs or bulbs 60, to the electrical contact 64 and to the first clamp 30. The circuitry is shown in FIG. 5, but other types of circuitry may be utilized without detracting from the invention.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An apparatus for replacing a dome light in a fixture, wherein the fixture is of the type having first and second clamps fixed to the fixture, wherein the dome light is of the type having an existing bulb having first and second metallic ends and a glass bulb containing a filament extending between the first and second metallic ends, and wherein the first and second metallic ends of the bulb are electrically connected to one another through the filament and the existing bulb has the first and second metallic ends removably clamped and electrically connected to the first and second clamps, the apparatus comprising:

a replacement board capable of replacing the bulb, the replacement board having a plurality of replacement bulbs electrically connected to one another, a third clamp electrically connected to the plurality of replacement bulbs that is capable of clamping to the first clamp, and a fourth clamp electrically connected to the plurality of replacement bulbs that is capable of clamping to the second clamp; and wherein the replacement board includes first and second opposite sides and a perimeter edge, the plurality of replacement bulbs being attached to the first side and the third and fourth clamps being on the second side of the replacement board.

2. The apparatus according to claim 1 wherein the replacement bulbs are LEDs.

3. The apparatus according to claim 1, wherein the first and second clamps have wings, and wherein the third and fourth clamps are adapted to cause the wings to expand upon insertion of the third and fourth clamps into the first and second clamps respectively to clamp the replacement board in place within the fixture.

\* \* \* \* \*